United States Patent [19]

Kennedy

[11] 4,035,574
[45] July 12, 1977

[54] MIXED PHASE EVAPORATION SOURCE

[75] Inventor: Kurt D. Kennedy, Berkeley, Calif.

[73] Assignee: Jersey Nuclear-Avco Isotopes, Inc., Bellevue, Wash.

[21] Appl. No.: 514,201

[22] Filed: Oct. 11, 1974

[51] Int. Cl.² .......................................... H05B 7/00
[52] U.S. Cl. ................................ 13/31; 75/84.1 R
[58] Field of Search ......... 13/31; 75/65 EB, 84.1 R; 148/132; 204/298; 432/264; 250/284

[56] References Cited

U.S. PATENT DOCUMENTS

| 3,205,068 | 9/1965 | Erler | 75/84.1 R |
| 3,364,296 | 1/1968 | Smith, Jr. | 13/31 |
| 3,437,328 | 4/1969 | Kennedy et al. | 432/264 X |
| 3,437,734 | 4/1969 | Roman et al. | 13/31 |
| 3,554,512 | 1/1971 | Elliot | 13/31 |

Primary Examiner—R. N. Envall, Jr.
Attorney, Agent, or Firm—Weingarten, Maxham & Schurgin

[57] ABSTRACT

Apparatus for reducing convection current heat loss in an electron beam evaporator. A material to be evaporated (evaporant) is placed in the crucible of an electron beam evaporation source along with a porous mass formed of a powdered or finely divided solid to act as an impedance to convection currents. A feed system is employed to replenish the supply of evaporant as it is vaporized.

25 Claims, 2 Drawing Figures

MIXED PHASE EVAPORATION SOURCE

FIELD OF THE INVENTION

This invention relates to material evaporation and in particular to a system for evaporating a material with reduced convection current heat losses.

BACKGROUND OF THE INVENTION

In the evaporation of high melting point metals, such as uranium for uranium enrichment as discussed in U.S. Pat. No. 3,772,519, incorporated herein by reference, the evaporated material has typically been heated in a crucible by furnace or electron beam techniques and the material to be vaporized (evaporant) then is emitted from hot surface regions of the molten metal. In so heating, it is likely that all, or nearly all, of the evaporant contained in the melting chamber or crucible becomes liquid due to the rapid heat transfer through the material from several phenomena, a significant one being convection currents in the molten material. The rapid convection of heat away from the surface of the molten evaporant reduces evaporation efficiency very substantially, and in the case of uranium, forces a hot, reactive metal up against the crucible walls where corrosion can lead to their more rapid degradation.

It is known and has been suggested that crucibles may be lined with a relatively inert liner to reduce the effect of the corrosive molten liquid on the crucible edges, see for example U.S. Pat. No. 3,437,328. Such liners, however, do not overcome the problem of heat transfer away from the point of evaporation and the resulting loss in efficiency.

BRIEF SUMMARY OF THE INVENTION

These and other difficulties in an evaporator for high vapor point metals are overcome in accordance with the preferred embodiment of the present invention which provides for a reduction of convection currents in a heated liquid supply of the metal being evaporated. In a typical application for the evaporation of elemental uranium for isotope separation, a crucible of water cooled copper forms a trough in which a melt, which in the solidified form substantially resembles a cermet, is provided. The melt comprises a uranium saturated, porous mass bulk. The porous mass is typically formed of a finely divided or powdered material having a much lower vapor pressure than that of the uranium to be evaporated. The uranium is saturated into the porous mass and is melted by the application of an electron beam in a line or series of spots along the surface of the melt. The molten uranium is readily vaporized by energy from the electron beam while the presence of the particulate material acts to impede convection currents in the molten uranium to thereby reduce the loss of heat from the region of application of the electron beam. Additionally, the reduced heat flow permits the uranium in the vicinity of the crucible walls to remain a solid and thus less corrosive.

BRIEF DESCRIPTION OF THE DRAWINGS

These and other features of the present invention will be more fully described in the detailed description of the preferred embodiment presented below for purposes of illustration, and not by way of limitation, and in the accompanying drawings of which.

DETAILED DESCRIPTION OF THE PREFERRED EMBODIMENT

In accordance with the teaching of the preferred embodiment of the present invention, apparatus is contemplated which is particularly useful to provide evaporation of a high vapor temperature material (relative to the environment) with reduced heat loss and improved operating efficiency. This improvement is realized by supplying the melt for evaporation as a combination of the evaporant in a porous mass of particulate material which reduces convection currents of the molten evaporant but sustains slower wicking flows to replenish the supply of evaporant. While particulate material for the porous mass is preferable, other forms of realizing the result of a porous convection impedance may be substituted. In the particular application to laser, isotope enrichment, the evaporant is subsequently photoexcited by isotopically selective radiation. It is important here that the particulate material, since a small portion becomes evaporated, not have an absorption line at any of the photon energies employed for photo-excitation where the excited material is the desired isotope.

Figure 1:
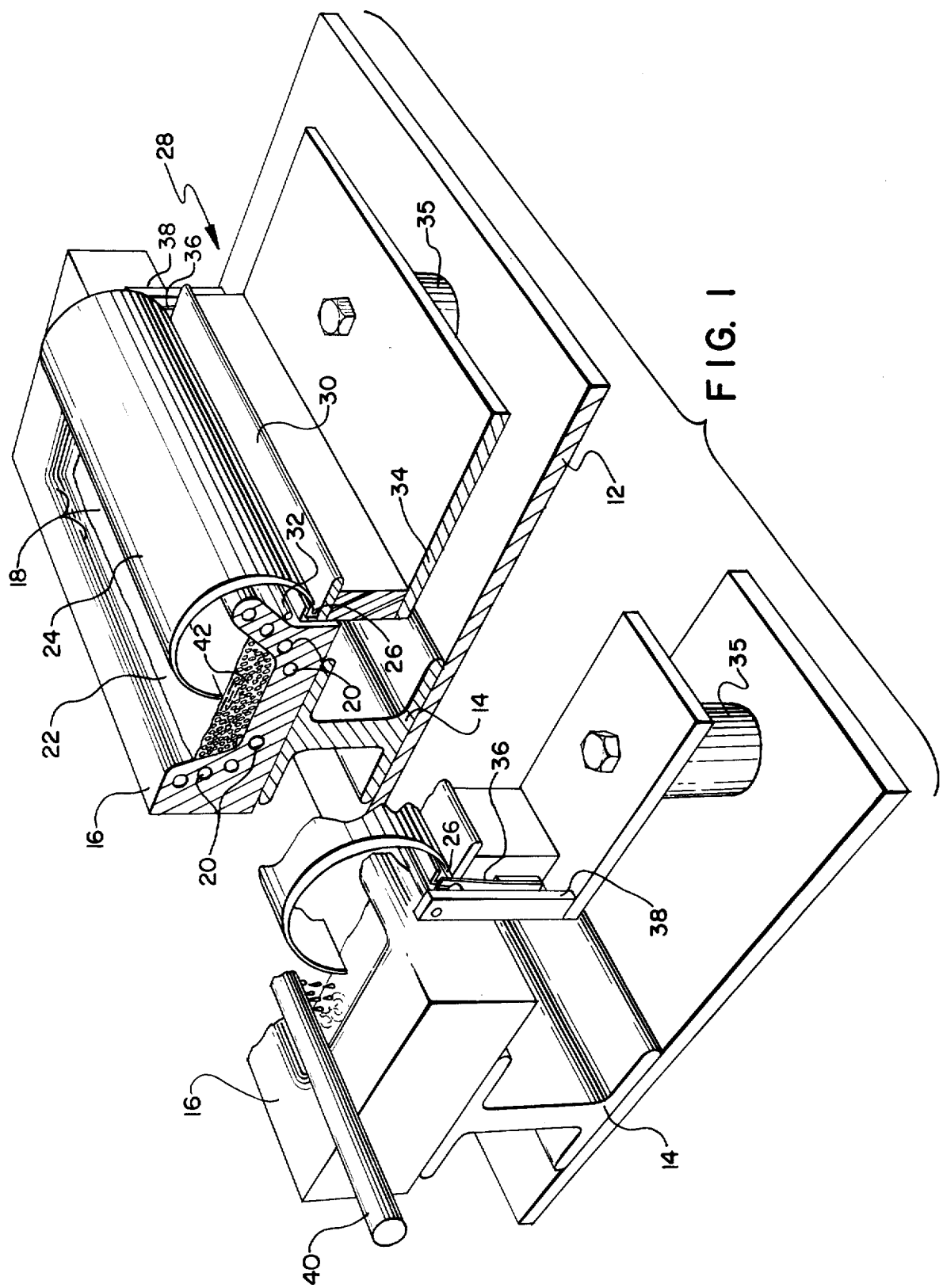
FIG. 1 is a pictorial view of apparatus for evaporating a high vapor point material in accordance with the present invention.

A structure for realizing this advantage is illustrated in the drawings. With reference to FIG. 1, a pictorial view of such an evaporate system is presented. A base plate 12 has an elongated crucible 16 with a trough 18 supported on the plate by a generally I-beam shaped support 14. The crucible 16 for uranium evaporation is typically formed of copper and has provided therethrough a plurality of cooling ports 20 for a cooling liquid, such as water, circulated by a system not shown. The ports 20 are located generally close to the portions of crucible 16 forming the trough 18. A melt 22 is provided in the trough 18 of the crucible 16 and the melt is heated by an electron beam 24 from an elongate filament 26 in an electron beam source 28. The source 28 is further shown to include a shield 30, an anode rod 32 and a plate 34 with insulators 35 which support the plate 34 from the base plate 12. The filament 26 is supported at ends by a conductive support structure 36 while the rod 32 is similarly supported by a bar 38 at each end.

Figure 2:
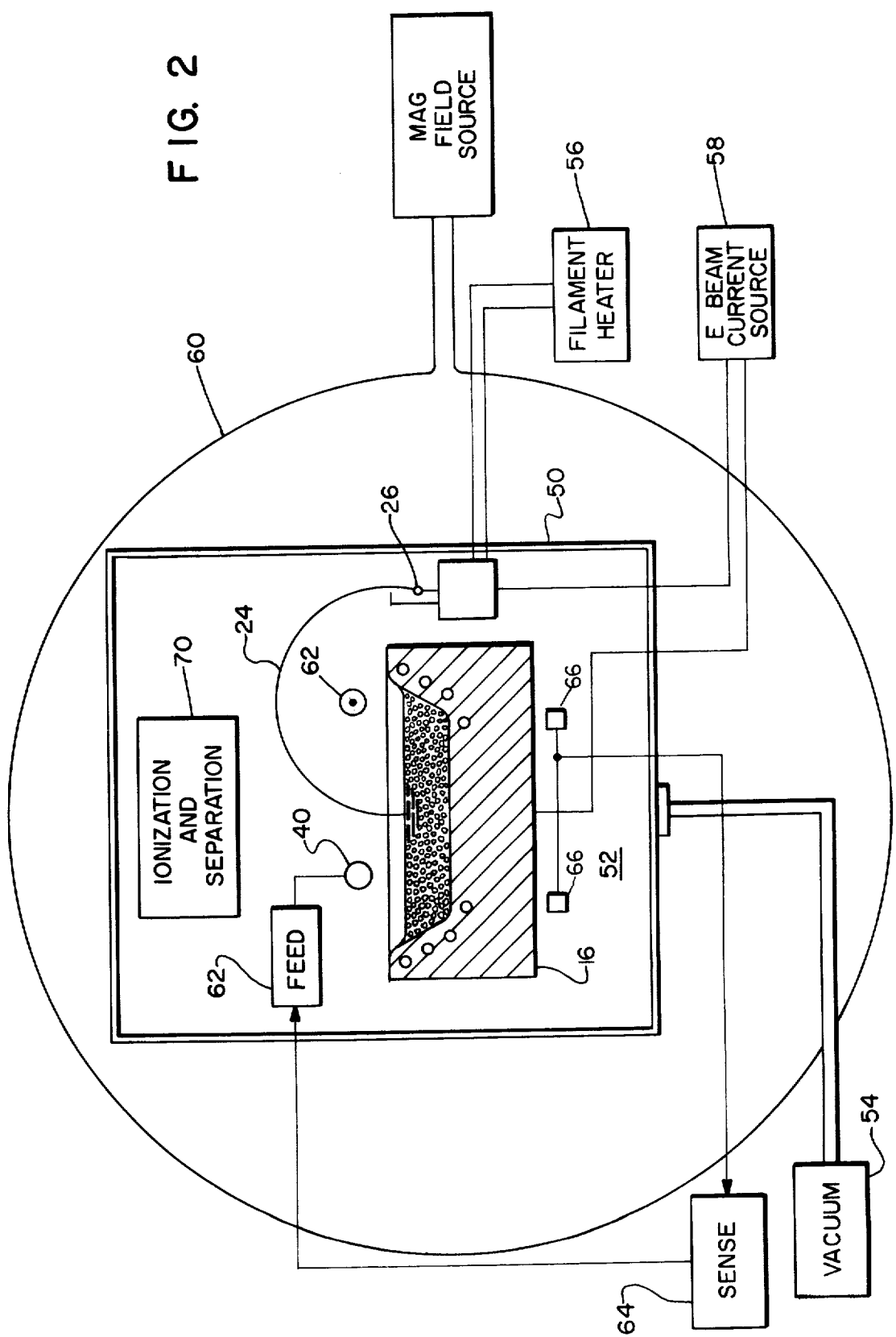
FIG. 2 is a schematic view of the apparatus of FIG. 1 including additional apparatus for uranium enrichment.

A magnetic field generally parallel to the long dimension of the surface of melt 22 and trough 18 is maintained at an appropriate intensity in the region of the apparatus of FIG. 1 by structure to be shown with respect to FIG. 2. Electrons accelerated from the heated filament 26 will be bent on an arc about magnetic lines of induction to a focus on a line at the surface of the melt 22. The filament 26 is maintained at a voltage with respect to the crucible 16 and other apparatus to provide an accelerating electric field for the electrons as will be described below.

The preferred embodiment of the present invention is for the evaporation of uranium metal to provide a generally radially expanding vapor flow above the line of contact of the electron beam 24 with the surface of melt 22. For this purpose, the melt 22 is composed of finely divided or powdered tungsten particles 42 which are saturated with uranium. Such a mixture may originally be established by mixing approximately equal weight and percent of powdered tungsten and uranium rods, the top of this mixture being solid uranium rods. The crucible is initially melted by sweeping a relatively low powered electron beam back and forth by varying the magnetic field. This permits the uranium to fully saturate the tungsten. If the amount of uranium present is insufficient to show liquid uranium on the surface, additional uranium can be added to achieve that condition. The solidified melt may resemble a cermet. The solubility of tungsten in uranium at the evaporation temperature is such that there appears to be no solid at the beam impact points. The tungsten goes into solution in this region but a relatively short distance away a mixed phase exists up to a point near the crucible wall where the temperature drops below the melting point of the uranium.

In operation, the electron beam 24 will gradually evaporate the uranium out of the fully molten area at beam impact. As the uranium in the immediate vicinity of the line of incidence of the electron beam is evaporated, the wicking action of the mixed phase region replenishes that supply until the overall saturated condition of the tungsten is substantially reduced.

In the application for uranium evaporation, particulate tungsten forms a suitable porous mass with a wicking action because of its higher point of vaporization than uranium and generally higher melting point. This insures that while the majority of the melt 22 may consist of molten uranium, the tungsten particles 42 will continue in a generally solid form, except for the melting mentioned near the line of beam impact. The higher tungsten vapor point minimizes its evaporation, but there will be some tungsten evaporation, the vapor flow can be assumed to contain a small amount of tungsten, as well as the uranium vapor. Under these conditions it is preferable, where isotopically selective photoexcitation of the expanding vapor is achieved, absorption lines for the uranium excitation be selected which will excite the desired uranium isotope without encompassing an absorption line for tungsten.

As the uranium is evaporated, the wicking action of the tungsten particles maintains a generally uniform "water table level" for the molten uranium in the melt 22. As this is reduced by vaporization, the uranium "water table" can be replaced by restoring uranium to the melt 22 from a feed rod 40. The feed rod 40 may be melted above the melt 22 by its heat. A drive mechanism illustrated in FIG. 2 is employed to extend the rod 40 over the melt 22 manually or automatically. It may also be projected toward beam 24.

The presence of the porous mass of particulate material, illustrated as the particles 42 in FIG. 1, in the melt 22 greatly impedes the circulation of convection currents in the molten uranium. This reduction in convection currents greatly lowers the heat lost from the line of incidence of the electron beam 24 on the surface of the melt 22 and thus greatly improves the efficiency of the evaporation system. In addition, the lowered heat flux from the electron beam 24 point of incidence to the crucible 16 maintains the portion of the uranium in the melt 22 at the boundaries with the crucible 16 in a solid form. The solid uranium is less corrosive on the walls in the trough of crucible 16, thereby lengthening its useful life.

It has been observed that by employing the concept of a particulate tungsten mass in a melt of uranium, a substantial increase in evaporation efficiency takes place along with a tendency to concentrate the vapor flow directly above the melt as opposed to a more typical cosine distribution. Almost two orders of magnitude increase in vapor flow rate were observed in using the particulate tungsten to evaporate uranium with a 72 kw. beam, 1 cm. by 18 cm. at impact.

The invention has been described above as a particular embodiment for use with uranium metal as an evaporant. It is clear that other metals may be used as an evaporant as well. One typical example is in evaporating aluminum wherein the melt 22 consists of a particulate tantalum carbide saturated with aluminum metal. The tantalum carbide has a higher vaporizing point than the aluminum and accordingly stays as in a solid particulate form, although a portion may be expected to melt and vaporize at the point of beam impact.

The criteria for preferred particulate materials are that they have temperatures of fusion and evaporization higher than that of the metal to be evaporated and that they not chemically react with the metal at the temperatures involved in evaporation, or with the crucible, of whatever material it may be manufactured. Depending upon the evaporant, tungsten, tantalum and Niobium may be expected to be useful for these purposes. The particle sizes may range generally from 10 microns to 1 mm to provide a relative freedom of water table flow to maintain a uniform height over the long term in response to evaporative depletion, but still maintain a substantial convection current barrier. As shown in FIG. 2, this crucible 16 may typically be 1 meter long by 10 centimeters wide, although there is no essential restriction on these dimensions.

With reference now to FIG. 2, the preferred embodiment of the present invention is illustrated schematically and described below in an exemplary, nonlimiting system context, typically a system for isotopically selective ionization for uranium enrichment. As shown schematically in FIG. 2, the FIG. 1 evaporative apparatus is enclosed by walls 50 to define a chamber 52 which is evacuated by an evacuation pump system 54 to a relatively low pressure which may typically be below $10^{-3}$ torr, preferably below $10^{-4}$ torr. The filament 26 is heated to an electron emitting condition by a filament current source 56 which may typically provide 100 watts per centimeter of length of the filament 26. The source of electrons for the beam 24 is provided by an electron beam current source 58 which maintains a 30 Kv potential between the filament 26 and crucible 16 at a current of approximately 0.13 amps. per centimeter length of the filament 26. The current source 58 maintains a positive charge at crucible 16 with respect to the filament 26. Surrounding the walls 50 of the chamber 52 is a plurality of axially separated coils including coil 60 adapted to maintain a magnetic field 62 in the region of the crucible 16 and particularly the electrom beam 24 so as to deflect and focus the beam to a line on the surface of the uranium melt 22. A field of approximately 150 gauss may be employed for this purpose.

The uranium feed rod 40 is controlled by a feed drive 62 in response to a signal from a sense system 64 which detects from floor sensors 66 change in the weight of the melt 22. The sensors 66 may be located at any convenient place.

Directly above the melt 22, typically 10 centimeters removed from it, is an ionization and separation structure 70 to which isotopically selective laser radiation is applied and in which cross field magneto-hydrodynamic forces are used to separate ionized particles.

Having described above a preferred embodiment according to the present invention, it will occur to those silled in the art that modifications and alternatives to the disclosed structure may be implemented within the spirit of the invention. It is accordingly intended to limit the scope of the invention only as indicated in the following claims.

What is claimed is:

1. Apparatus for vaporizing a material to establish a vapor flow thereof comprising:
    a container for the material to be evaporated;
    a melt within said container and comprising:
        a mixture of said material to be evaporated; and
        a porous mass;
    means for heating said melt in a region to liquify said material to be evaporated in an area surrounding said region and to evaporate said material from a portion of the liquified region;
    the porous mass providing a convection current impedance to the liquified material.

2. The apparatus of claim 1 wherein said porous mass has a low vapor pressure compared to the material for evaporation at the temperature at which said material for evaporation vaporizes.

3. The apparatus of claim 2 wherein said material is uranium and said porous mass is tungsten.

4. The apparatus of claim 1 wherein said porous mass is liquified in the region of the liquified material.

5. The apparatus of claim 4 wherein the melt includes a mixed phase region where said material is liquified and said porous mass is solidified.

6. The apparatus of claim 5 wherein the material and the porous mass of the melt are solidified near the region adjacent to said container.

7. The apparatus of claim 6 wherein said container includes copper and said material includes uranium.

8. The apparatus of claim 1 further including means for replenishing the supply of said material for evaporation in the molten area thereof.

9. The apparatus of claim 8 further including means for sensing depletion of said material for evaporation and for actuating said replenishing means in response thereto.

10. The apparatus of claim 8 wherein the means for replenishing the material supply includes means for feeding a solid rod of said material above the melt to cause melting of a portion of the rod.

11. The apparatus of claim 1 wherein said material for evaporation includes aluminum and said porous mass includes particulate tantalum carbide.

12. The apparatus of claim 1 wherein said porous mass includes a particulate material having a low vapor pressure at the vaporization point of said material for evaporation.

13. The apparatus of claim 1 wherein said container includes a trough shaped crucible having therein a plurality of cooling passages for a cooling fluid to flow therethrough.

14. The apparatus of claim 1 further including means for ionizing with isotopic selectivity the material evaporated from said melt.

15. The apparatus of claim 1 wherein the heating means includes means for applying an electron beam to a surface of the melt.

16. The apparatus of claim 15 wherein the electron beam is applied in a line along the surface of the melt.

17. The apparatus of claim 16 wherein the power density of the electron beam is at least approximately 4 kw./cm. of applied beam length.

18. The apparatus of claim 17 wherein the material is elemental uranium and the porous mass is particulate tungsten.

19. Apparatus for vaporizing elemental uranium to establish a vapor flow thereof comprising:
    a cooled crucible;
    a melt within said crucible comprising a mixture of elemental uranium and particulate tungsten;
    sufficient elemental uranium being included in the melt to bring the uranium to the surface of the melt; and
    means for applying an electron beam to the melt within the crucible to heat the melt to a condition of molten uranium and tungsten in the region of electron beam impact, solid uranium and tungsten in the region adjacent the crucible and a mixed phase region of molten uranium and solid tungsten elsewhere;
    the mixed phase region including a substantial portion of the melt to provide a convection impedance to the flow of molten uranium convection currents.

20. The apparatus of claim 19 including means for generally maintaining a level of uranium in the mixed phase region to provide uranium at the surface of the melt.

21. An improved melt for use in apparatus for evaporating a material by local surface heating of the melt, said melt comprising in use:
    a material to be evaporated;
    a porous mass substantially in a solid phase and having the material to be evaporated substantially in a liquid phase distributed throughout said porous mass to provide a mixed phase region.

22. The improved melt of claim 21 which has uranium as the material to be evaporated and particulate tungsten as the porous mass.

23. Apparatus for evaporating uranium from the improved melt of claim 22 comprising means for applying an energetic beam to a surface of said melt to provide local heating thereof to the vaporization temperature for the uranium.

24. The improved melt of claim 21 wherein the melt has the general characteristics of a cermet.

25. The melt of claim 21 wherein the mixed phase region of said melt surrounds a region wherein said porous mass and said material are both substantially in a liquid phase.

* * * * *